United States Patent [19]

Lee et al.

[11] Patent Number: 4,571,097
[45] Date of Patent: Feb. 18, 1986

[54] TAPERED ROLLER BEARING WITH PRESSURIZED RIB RING

[75] Inventors: Peter W. Lee, Canton; Gary E. Kreider, Massillon; Ronald L. Widner, North Canton, all of Ohio

[73] Assignee: The Timken Company, Canton, Ohio

[21] Appl. No.: 694,441

[22] Filed: Jan. 24, 1985

[51] Int. Cl.[4] .............................................. F16C 33/66
[52] U.S. Cl. .................................. 384/469; 384/471; 384/564; 384/571
[58] Field of Search ............... 384/469, 471, 474, 564, 384/571; 29/149.5 PM

[56] References Cited

U.S. PATENT DOCUMENTS

| | | | |
|---|---|---|---|
| 2,368,963 | 2/1945 | Boden | 184/11 |
| 3,004,806 | 10/1961 | Schinnerer . | |
| 3,110,085 | 11/1963 | Sternlicht | 29/149.5 |
| 3,630,584 | 12/1971 | McKee | 384/469 |
| 3,675,978 | 7/1972 | McKelvey . | |
| 3,698,514 | 10/1972 | Buck et al. | 184/6.4 |
| 3,763,534 | 10/1973 | Conroy et al. | 29/148.4 B |
| 3,782,795 | 1/1974 | Richey et al. . | |
| 3,804,476 | 4/1974 | Nakamura et al. | 384/469 |
| 3,811,743 | 5/1974 | Wren . | |
| 3,913,992 | 10/1975 | Scott et al. . | |
| 4,104,061 | 8/1978 | Roberts | 75/211 |
| 4,466,165 | 8/1984 | Otto | 29/149.5 PM |

FOREIGN PATENT DOCUMENTS 2014252 8/1979 United Kingdom .

*Primary Examiner*—Lenard A. Footland
*Attorney, Agent, or Firm*—Gravely, Lieder & Woodruff

[57] ABSTRACT

A tapered roller bearing has a rib ring against which the large ends of the tapered rollers for the bearing bear to prevent those rollers from being expelled from the annular space between the tapered raceways. The rib ring includes a porous, yet rigid, core and a jacket which covers the exposed surfaces of the core, except along an abutment face at which the large end faces of the rollers contact the rib ring. Here the pores of the core are exposed. The core at one of its other faces has a groove and the jacket has a port that opens into the groove. Pressurized oil is directed through the port and into the groove, from which it flows through the pores of the core and emerges at the abutment surface where it reduces friction between the abutment surface and the roller end faces.

19 Claims, 2 Drawing Figures

TAPERED ROLLER BEARING WITH PRESSURIZED RIB RING

BACKGROUND OF THE INVENTION

This invention relates in general to bearings, and more particularly to a tapered roller bearing and a lubrication system and process therefor.

Tapered roller bearings are capable of taking large radial loads as well as axial or thrust loads. Moreover, when two single row bearings are mounted in pairs, the one bearing may be adjusted against the other to control clearances in the bearings, thus enabling the assembly to be adjusted to a desired condition of end play or preload. These characteristics render tapered roller bearings particularly suited for use in machine tools, that is for supporting the spindles of such tools in their head stocks. In this regard, a typical machine tool spindle is often subjected to both heavy radial and axial loads while at other times it operates under more moderate loads, yet in any event it must possess extreme stability. This is achieved by operating the bearings for the spindle under a condition of preload, which of course eliminates all radial and end play in the bearings and supported spindle.

When a typical roller bearing is under preload, the mounting itself, without the imposition of any external loading, exerts an axial load on the bearings, thus eliminating all radial and axial free motion in the bearings, while nevertheless leaving the spindle free to rotate. A preloaded bearing, however, in contrast to one that is adjusted to a condition of end play, requires greater power to overcome friction within the bearing itself, and is more likely to sustain damage, particularly in the absence of adequate lubrication.

Perhaps the most critical area of a tapered roller bearing insofar as maintaining lubrication is concerned is the face against which the large diameter ends of the tapered rollers bear as they roll between the tapered raceways. This face is usually on a thrust rib that is formed integral with the cone (inner race) at the large end of the cone raceway, although it may in the alternative be on a rib ring at the large end of the cup (outer race) raceway. In either case, the surface resists the forces which tend to urge the tapered rollers axially out of the bearing and thus serves to position the rollers in the axial direction within the bearing. The large end faces of the rollers both roll and slide along the surface, and unless adequate lubrication is maintained at that surface, the bearing will overheat and perhaps sustain damage.

Tapered roller bearings are commonly lubricated with grease, but grease is not always suitable for high speed machine tool applications, because it may channel or break down in service. In some applications oil is preferred, and indeed tapered rollers will actually pump oil from their small ends to their large ends where it will flow against the face which positions the rollers. However, oil introduced at the small diameter ends of the rollers undergoes a considerable amount of churning as it passes along the rollers, and this causes the oil to experience a substantial rise in temperature. Oil mist is another technique used to lubricate tapered roller bearings, but it cannot meet the demands of high speed machine tool bearings with reliability.

SUMMARY OF THE INVENTION

One of the principal objects of the present invention is to provide a tapered roller bearing having improved means for introducing lubrication into the bearing. Another object is to provide a bearing of the type stated in which the amount of oil that is introduced is maintained under precise control. A further object is to provide a bearing of the type stated in which the lubrication is forced through a porous rib ring that positions the tapered rollers in the bearing and in which the oil emerges from the rib ring at the surface thereof against which the large ends of the tapered rollers bear. An additional object is to provide a lubricated tapered roller bearing that is ideally suited for use in machine tools. Still another object is to provide an improved process for lubricating a tapered roller bearing. These and other objects and advantages will become apparent hereinafter.

DESCRIPTION OF THE DRAWINGS

In the accompanying drawings which form part of the specification and wherein like numerals and letters refer to like parts wherever they occur—

DETAILED DESCRIPTION

Figure 1:
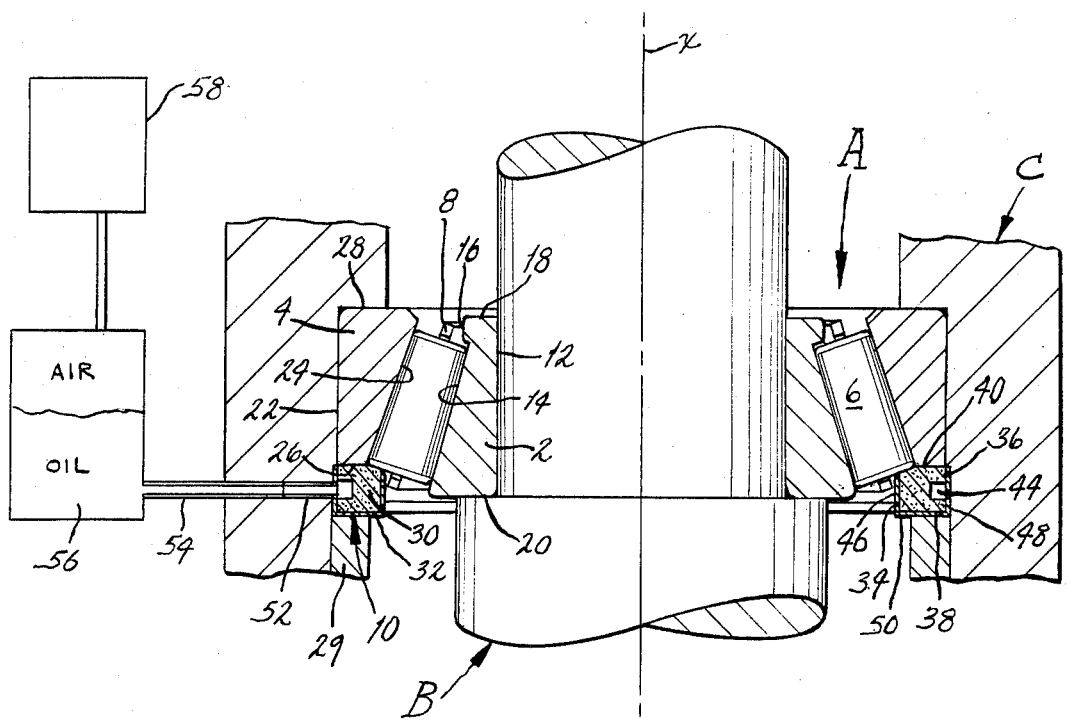
FIG. 1 is a sectional view of a bearing assembly having a tapered roller bearing provided with a pressurized rib ring constructed in accordance with and embodying the present invention.
Figure 2:
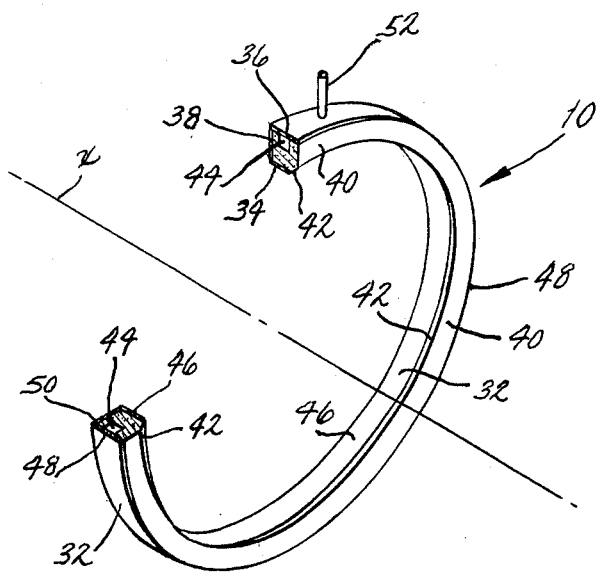
FIG. 2 is a perspective view, partially broken away and in section of the pressurized rib ring.

Referring now to the drawings, a tapered roller bearing A (FIG. 1) is capable of carrying both radial and axial or thrust loads while providing a high degree of stability for a supported machine part, and this enables the supported part to rotate about an axis x without any free motion in the radial or axial directions. As such that bearing A is ideally suited for use in a machine tool where the axis x of rotation must remain extremely stable. In particular, the bearing A may be used to support a spindle B in the head C of a machine tool, although it is certainly suitable for other applications as well. In any event, the bearing A is used in combination with another bearing which faces in the opposite direction, so that the two bearings may be adjusted against each other to control end play or preload in the overall bearing assembly.

The bearing A includes several basic components, namely, a cone 2, a cup 4 that surrounds the cone 2, a complement of tapered rollers 6 arranged in a single row between the cone 2 and cup 4, a cage 8 for maintaining the correct spacing between the rollers 6, and a rib ring 10 that serves as an abutment for preventing the rollers 6 from being expelled from the space between the cone 2 and cup 4.

Preferably the cone 2 and cup 4 are formed from a high quality wrought bearing steel of the type commonly used in bearings, and the same holds true with regard to the tapered rollers 6. The cage 8 may be a metal stamping or may be made from a polymer material. The rib ring 10, on the other hand, should contain a porous material which is rigid and resistant to wear. This material serves as a conduit for directing oil to the surface against which the large ends of the rollers bear.

The cone 2 contains a bore 12 into which the spindle B tightly fits and also a tapered raceway 14 which is presented away from the bore 12 and spindle B. At the small end of its raceway 14, the cone 2 possesses a retaining rib 16 which projects outwardly from the adjacent end of the raceway 14. The rib 16 has a cone front face 18. The large end of the cone raceway 14, on the other hand, merges into a back face 20 which bears against a shoulder or nut or some other type of positioning device on the spindle B. Both the cone front face 16 and cone back face 20 are perpendicular to the axis x of rotation.

The cup 4 has a cylindrical outer surface 22 along which the cup 4 fits snugly into the head C, and in addition has a tapered raceway 24 which is located opposite to and generally surrounds the cone raceway 14. At one end of the cup 4 is a front face 26 and at the other is a back face 28. Both faces 26 and 28 are perpendicular to the axis x and extend between the cylindrical outer surface 22 and the cup raceway 24, but the latter being at the small end of the cup raceway 24 possesses greater surface area. Indeed, the back face 28 bears against a shoulder or some other positioning device in the head C. The rib ring 10 fits tightly against the cup front face 26.

The tapered rollers 6 occupy the space between the cone 2 and cup 4, and along their tapered side faces contact the two raceways 14 and 24, there being line contact between each roller 6 and the two raceways 14 and 24. The raceways 14 and 24 are on apex, meaning that if each were extended to an apex, the two raceways 14 and 24 will have their apexes located at a common point along the axis x. As a consequence, pure rolling contact occurs between the rollers 6 and the raceways 14 and 24 when the cup 4 rotates relative to the cone 2 or vice-versa. The rollers 6 are axially positioned by the rib ring 10 against which the large diameter ends of the rollers 6 bear. In this regard, the large diameter ends of the rollers 6 are somewhat spherical, for that configuration maintains the rollers 6 in the proper orientation between the raceways 14 and 24.

The cage 8 tapers to conform generally to the annular space in which it fits between the two raceways 14 and 24, and thus assumes the generally angular orientation of the rollers 6. Its small diameter end surrounds the retaining rib 16 of the cone 2, while its large end lies within the rib ring 10. Thus, the cage 8 rotates as the rollers 6 move along the two raceways 14 and 24 and serves to maintain the proper spacing between adjacent rollers 6.

The rib ring 10 fits against the front face 26 of the cup 4 where it projects inwardly beyond the large end of the cup raceway 24 so as to prevent the rollers 6 from moving axially out of the annular space between the two raceways 14 and 24. Actually, the rib ring 10 and the cup 4 are clamped tightly together within the head C by a retaining sleeve 29 that also fits into the head C, so that the cup 4 and rib ring 10 do not move apart during operation of the bearing A. The rib ring 10 supplies oil to the large end faces of the rollers 6 as the rollers 6 roll and slide along the rib ring 10, thus reducing friction at this critical area of the bearing A. It includes a porous core 30 and a jacket 32 which extends over much of the core 30.

The core 30 is rigid and resistant to wear, yet is porous with its pores being interconnected. To this end, the core 30 is formed from powdered metal which has been compressed to between 65 and 85 percent of theoretical density and then sintered to provide a somewhat rough ring form or annulus. This ring form is then machined to provide it with distinct surfaces of precise dimensions, namely an inner cylindrical surface 34 having a diameter somewhat less than the diameter of the large end of the cup raceway 24, an outer cylindrical surface 36 which is about the same diameter as the outer cylindrical surface 22 of the cup 4, a large end face 38 which extends between the two cylindrical surfaces 34 and 36 perpendicular to the axis x and faces away from the cup 4, a small diameter end surface 40 which is also perpendicular to the axis x and is about the same size as the front face 26 of the cup 4 which it faces, and a roller abutment surface 42 which extends between the small end surface 40 and the inner cylindrical surface 34 oblique to each. Indeed, the inner margin of the abutment surface 42 is located at the small end of the cup raceway 24, the surface 42 projecting outwardly therefrom generally perpendicular to the cup raceway 24. In the machining, the core 30 is also provided with an annular groove 44 that opens out of the outer cylindrical surface 36.

Along the abutment surface 42 and at the surfaces of the groove 44, the pores of the powdered metal core 30 are exposed. In this regard, the machining which leaves the faces 34, 36, 38, 40, and 42 on the core 30 and the groove 45 in it also obliterates the pores at those surfaces. In other words, the machining tends to cause the metal to smear over the pores and seal them, producing a thin surface layer which is commonly referred to as the "Beilby layer". This layer inhibits oil from entering the core 30 and thereafter emerging from the core 30, and accordingly it is removed at least along the abutment surface 42 and also where oil enters the core 30, that is along the surfaces of the groove 44. This may be achieved by immersing the core 30 in an etchant, or at least exposing the abutment face 42 and surfaces of the groove 44 to an etchant. It may also be achieved by ion milling, that is subjecting the core 30, at least at the face 42 and a surface of the groove 44, to an ionized gas, the molecules of which bombard those surfaces.

Suitable powdered metals for use in the core 30 and processes for converting them into a machined annulus suitable for the core 30 of the bearing A are set forth in copending application Ser. No. 06/578,025 of C. F. Jatczak, P. W. Lee, and P. S. Orvos, filed Feb. 8, 1984, and entitled Tapered Roller Bearing Capable of Sustained Operation Without Lubricant Replenishment.

While the oil should enter the core 30 at the groove 45 and emerge from the abutment face 42, it is not particularly desirable to have it flow from the other faces 34, 36, 38, and 40, for that will only detract from the oil that is left for the abutment face 42. The jacket 32, which is impervious to the oil, extends over the faces 34, 36, and 38 and in effect seals them, while the remaining face 40 tightly abuts the front face 26 of the cup 4. Thus only the abutment surface 42 is exposed, so that the large end faces on the tapered rollers 6 will contact that surface and be exposed to the open pores in it. More specifically, the jacket 32 includes an inner wall 46 and an outer wall 48 which are cylindrical and also an end wall 50 which ends between and connects the two cylindrical walls 46 and 48. The inner wall 46 extends over the inner cylindrical surface 34 of the core 30, while the outer wall 48 extends over the outer cylindrical surface 36 and further fits tightly into the head C. The end wall 50 covers the large end face 38. All of the walls 46, 48, and 50 are sealed to the respective surfaces 34, 36, and 38 which they cover on the core 30, and this may be achieved by interposing a sealant, such as an anaerobic adhesive, between each wall and the core surface that it covers. The sealant plugs the pores on those surfaces to prevent oil that is within the core 30 from seeping out beneath the walls 46, 48, and 50 of the jacket 32. While the jacket 32 does not cover the small end face 40 of the core 30, that face is clamped tightly against the cup front face 26 which to a measure prevents oil from escaping at the face 40, but any oil which does escape migrates to the abutment face 42, where it is desired, because both the cup 4 and rib ring 10 are fitted tightly in the housing C.

In addition, the jacket 32 is provided with an inlet port 52 which extends from the outer wall 46 and opens into the groove 44 of the core 30. Oil flows through the port 52 and into the groove 44 which it fills, and the pores of the core 30, being exposed along the surfaces of the groove 44, allow the oil to pass into the porous core 30. Since all remaining surfaces, save the abutment surface 42 on the core 30 are in effect sealed, the oil which passes into the core 30 at the groove 44 emerges at the abutment surface 42. Any oil that seeps from the core 30 at its small end face 40 migrates onto the abutment face 42, for there is no other place for it to go. To accommodate the outwardly directed port 52, the head C is relieved in the region of the rib ring 10.

The inlet port 52 of the rib ring 10 is connected by means of an oil line 54 to an oil reservoir 56 which holds a lubricating oil. Moreover, the reservoir 56 is sealed and pressurized with air that is forced into it by an air pump 58, the reservoir 56 being arranged such that the oil is between the port 52 and the pressurized air, so that the oil exists at the pressure of the air. That pressure is easily varied. Indeed, the pressure is established at a magnitude which enables the oil to flow through the porous core 30 and emerge from the abutment face 42 as a precisely controlled flow.

Actually the rate at which the oil flows from the abutment face 42 of the rib ring 10 depends on the pressure that is maintained in the reservoir 56, and that pressure may be adjusted with considerable precision. Thus, the rate of flow may be varied to accommodate different operating conditions of the spindle B and its bearing A.

In operation, the bearing A provides a support for the spindle B, yet allows the spindle B to rotate about the axis x without deviation. In other words, the bearing A and its companion bearing are in a condition of zero end play or more likely slight preload, so no radial or axial clearance exists in the bearing A. Thus, the spindle B is supported in a very stable condition—one that does not afford either radial or axial free motion. When the spindle B turns, the tapered rollers 6 roll between the raceways 14 and 24 on the cone 2 and cup 4, respectively, there being pure rolling contact between the rollers 6 and raceways 14 and 24. The large end faces of the rollers 6, on the other hand, bear against the abutment face 42 on the core 30 of the rib ring 10 and are thereby axially positioned in the annular space between the two raceways 14 and 24. Indeed, the rib ring 10 resists the forces which tend to expel the rollers 6 from the annular space between the two raceways 14 and 24, those forces being applied by the induced load of the mounting as well as from loads on the spindle B. The large ends of the rollers 6 experience a combination of sliding and rolling motion with respect to the abutment face 42.

Unless an adequate supply of lubrication exists along the abutment face 42, excessive friction will develop between that surface and the large end faces of the rollers 6, causing the bearing A to overheat and perhaps be damaged. The necessary lubrication derives from the oil in the reservoir 56. That oil, being under pressure, flows through the tube 54 and port 52 into the groove 44 in the core 30 of the rib ring 10, from which it enters the pores of the porous core 30, totally filling those pores. Since abutment face 42 is not sealed, the oil escapes from that surface, while any oil that escapes from the end face 40 migrates to the abutment face 42. Thus, a lubricant film is provided between the face 42 and the large ends of tapered rollers 6. This film significantly reduces friction between the abutment face 42 and the end faces of the rollers 6, which in turn enables the bearing A to operate with low torque and at reasonably low temperatures. As a consequence, the bearing A is preserved and the spindle B and head C do not undergo any appreciable thermal expansion.

The rate at which oil exudes from the abutment face 42 may be varied by changing the pressure in the reservoir 56—the greater the pressure, the greater the rate at which the oil flows. Thus, the flow may be regulated to assure that the optimum amount of oil escapes from the face 42. For example, when light loads and slow speeds exist at the spindle B, the pressure in the reservoir 56 may be kept low and this translates into a relatively low rate of flow from the abutment face 42. On the other hand, when the loads are heavy or the speeds high, the pressure in the reservoir 56 is increased so that the rate of flow from the abutment face 42 increases to accommodate the greater friction associated with such heavier loads or higher speeds.

In lieu of forming the jacket 32 as a separate component, it may take the form of a metal, such as chromium, applied as a plating to the inner and outer cylindrical surfaces 34 and 36 and the end faces 38 and 40, as well, but not to the abutment face 42 or the surfaces of the groove 44. In that case, the rib ring 10 would fit tightly into the head C to prevent oil from escaping along the outer cylindrical surface 36. The jacket 32 may also take the form of a lacquer or paint applied to the cylindrical surfaces 34 and 36 and the end faces 38 and 40 as a so-called "stop-off".

This invention is intended to cover all changes and modifications of the example of the invention herein chosen for purposes of the disclosure which do not constitute departures from the spirit and scope of the invention.

We claim:

1. A tapered roller bearing assembly comprising: a first race having a tapered raceway: a second race having a raceway located opposite the raceway of the first race; tapered rollers arranged in a circular row between the two races and contacting the raceways so as to roll along the raceways when one of the races turns relative to the other race; a rib ring mounted in a generally fixed position with respect to one of the races and having an abutment surface against which the large ends of the tapered rollers bear so as to prevent the rollers from being expelled from the space between the two raceways, the rib ring including a porous material, the pores of which are exposed along the abutment surface; and means for introducing fluent lubricant into the porous material of the rib ring remote from the abutment surface, so that the lubricant flows through the pores of that material and emerges at the abutment surface where it reduces friction between the abutment surface and the large end faces of the tapered rollers.

2. A tapered roller bearing assembly according to claim 1 wherein the porous material of the rib ring is an annular core on which the abutment surface exists, and the core is sealed on its surfaces that are presented away from the race with which the rib ring is fixed, except at the abutment surface and where the fluent lubricant is introduced into it.

3. A tapered roller bearing assembly according to claim 2 wherein the core is enclosed in an impervious jacket that extends along those of its surfaces that are present away from the race with which the rib ring is fixed, except the abutment surface and where the lubricant is introduced in the core.

4. A tapered roller bearing assembly according to claim 1 wherein the means for introducing a fluent lubricant includes a reservoir containing oil and being in communication with the core, and means for placing the oil within the reservoir under pressure such that the pressure within the reservoir may be varied.

5. A tapered roller bearing assembly according to claim 1 wherein the porous material is an annulus formed from a powdered metal that has been compacted and sintered.

6. A tapered roller bearing assembly according to claim 5 wherein the annulus has been further machined and etched at least along its abutment surface to expose the pores of the material at that surface.

7. A tapered roller bearing assembly according to claim 5 wherein the powdered metal of the porous material is at between about 65 and about 85% of theoretical density.

8. A tapered roller bearing comprising: a cone having an outwardly presented tapered raceway; a cup surrounding the cone and having an inwardly presented tapered raceway located opposite to the raceway of the cone; tapered rollers arranged in a row between the cone and cup and being against the raceways so as to roll along the raceways when relative rotation between the cone and cup occurs; and a rib ring mounted in a generally fixed position with respect to one of the raceways at the large end of that raceway and having an abutment surface against which the large ends of the rollers bear, whereby the rib ring prevents the rollers from being expelled from the space between the raceways, the rib ring being formed from a porous material, the pores of which are exposed and open along the abutment surface, the rib ring also having means for directing oil into the porous material so that it will flow out of that material at the abutment surface to reduce friction between the abutment surface and the large end faces of the tapered rollers.

9. A tapered roller bearing according to claim 8 wherein the porous material forms a core on which the abutment surface as well as other surfaces exist.

10. A tapered roller bearing according to claim 9 wherein the means for directing oil into the porous material includes an impervious jacket which extends over at least some of the other surfaces of the core and a port on the jacket for enabling oil to flow against the core.

11. A tapered roller bearing according to claim 10 wherein the impervious jacket has walls which are against other surfaces of the core and at least some of the jacket walls are sealed to the surfaces of the core against which they are presented, all to cause oil to flow into the porous core instead of over its other surfaces.

12. A tapered roller bearing according to claim 10 wherein the core has a groove that opens out of one of its surfaces and the port opens into the groove.

13. A tapered roller bearing according to claim 10 wherein the core is formed from a powdered metal that has been compressed to less than 100% of theoretical density and sintered.

14. A tapered roller bearing according to claim 8 wherein the rib ring is positioned against the cup such that its abutment surface extends inwardly from the large diameter end of the raceway for the cup.

15. In combination with the tapered roller bearing of claim 8, a reservoir containing oil and being connected with the means for directing oil into the porous material and means for pressuring the oil within the reservoir.

16. The combination according to claim 15 wherein the pressure within the reservoir may be varied to vary the rate at which oil flows from the abutment surface.

17. A process for lubricating a tapered roller bearing having a race provided with tapered raceways, tapered rollers against the tapered raceways, and a porous rib ring located at the large diameter end of one of the tapered raceways and having an abutment face against which the large diameter ends of the tapered rollers bear, the pores of the porous rib ring being exposed at the abutment face, said process comprising: forcing oil into the porous rib ring at a location thereon other than the abutment face, with the oil being under sufficient pressure to pass through the rib ring and exude from the abutment face, whereby an oil film is maintained between the large diameter ends of the tapered rollers and the abutment face on the rib ring.

18. A process according to claim 17 and further comprising maintaining oil under pressure within a reservoir that is connected with the rib ring, whereby the oil is forced from the reservoir into the rib ring.

19. A process according to claim 18 and further comprising varying the pressure of the oil within the reservoir to thereby control the rate at which the oil exudes from the abutment face of the rib ring, so that the rate at which the oil flows at any time is generally optimum for the condition under which the bearing operates at that time.

* * * * *